United States Patent [19]

Kotaro et al.

[11] 4,147,332
[45] Apr. 3, 1979

[54] METHOD FOR RECOVERING HEAT FROM MOLTEN SLAG AND AN APPARATUS THEREFOR

[75] Inventors: Ishii Kotaro; Mitsutsuka Masahiko; Osada Tomoyuki, all of Shibatashi, Japan

[73] Assignee: Pacific Metals Co., Ltd., Japan

[21] Appl. No.: 822,338

[22] Filed: Aug. 5, 1977

[30] Foreign Application Priority Data

Aug. 5, 1976 [JP] Japan .................................. 51-092789

[51] Int. Cl.² .............................................. C21B 3/06
[52] U.S. Cl. .......................................... 266/44; 65/19; 266/200
[58] Field of Search .................... 34/63, 135, 136, 137; 65/19; 264/12; 266/44, 200, 202, 217; 432/67, 70, 106, 197

[56] References Cited

U.S. PATENT DOCUMENTS

| | | | |
|---|---|---|---|
| 883,770 | 4/1908 | Wood | 65/19 |
| 996,132 | 6/1911 | Perkins et al. | 65/19 |
| 1,506,803 | 9/1924 | Astrom | 65/19 |
| 2,873,554 | 2/1959 | Sifrin et al. | 65/19 |
| 3,897,231 | 7/1975 | Massey et al. | 264/12 X |

FOREIGN PATENT DOCUMENTS 51-69482  6/1976  Japan ........................................ 266/200

Primary Examiner—Gerald A. Dost
Assistant Examiner—Paul A. Bell
Attorney, Agent, or Firm—Wenderoth, Lind & Ponack

[57] ABSTRACT

Molten slag discharged from a metallurgical furnace and flowing down from a slag trough is atomized by air jet into a primary heat-exchanger of rotary cylindrical type and hot slag granules thus obtained and air are caused to pass in a co-current therethrough so as to exchange the heat of the slag to the air flow to obtain a primary hot blast, then the hot slag granules discharged from the primary heat-exchanger are supplied to a secondary heat-exchanger connected to the primary heat-exchanger where the hot slag granules are brought into contact with a counter flow of cold air supplied from outside the system, or with a counter flow of a mixture of the above cold air and a part of the primary hot blast exhausted from the primary heat exchanger to effect heat-exchange and to recover a secondary hot blast.

11 Claims, 3 Drawing Figures

METHOD FOR RECOVERING HEAT FROM MOLTEN SLAG AND AN APPARATUS THEREFOR

BACKGROUND OF THE INVENTION

1. Field of the Invention

The present invention relates to a method for recovering heat from molten metallurgical slag using a heat recovery equipment comprising as main component elements a primary heat-exchanger of rotary cylindrical type having a crushing or atomizing device for crushing or atomizing the molten slag with air jet, and a secondary heat-exchanger for recovering high temperature blast from hot slag granules discharged from the primary heat-exchanger.

2. Description of Prior Art

Generally, in the smelting process of ores and in the refining process of crude metals, a large amount of high temperature molten slag is produced, and the heat brought by the slag out of the system is very large. However, the molten slag is a high-temperature product, it changes considerably in its nature during its cooling process from the liquid state to the solid state so that it is very difficult to handle, and it has very low industrial value. For the above reasons and others, the molten slag discharged from a metallurgical furnace is once cooled in a water-granulation equipment or in a dry pit, and only part of it is utilized as ballast and building material but the greatest part is wasted.

Therefore, to date, the slag has never been utilized from the aspect of its heat recovery, and an enormous amount of heat energy has been left unutilized.

Meanwhile, in recent years, "save resources" and "save energy" have been strongly and loudly advocated world wide, and the recovery of exhausted heat from the molten slag has been one of the most important and urgent problems to be solved.

Particularly, in the field of ferro-nickel production, where a rotary kiln (calcining the ores) and an electric furnace (for reduction melting of the ores) are mostly used, a large amount of molten slag is produced from the electric furnace, reaching as large as 30–40 ton, per ton of nickel content in the ferro-nickel produced. Further, as the molten slag is at a temperature as high as 1500° to 1600° C., it occupies almost about 50% of the heat consumption in the electric furnace, which corresponds to about $15 \times 10^6$ kcal per ton of Ni, equivalent to 1500 l of heavy oil.

In recent years, the world nickel resources are being rapidly exhausted, and along this, the grade of the nickel ores has been lowering steadily. As the nickel ore grade becomes lower, the amount of slag produced per ton of nickel becomes much increased, and this tendency is increasing. Therefore, the importance of the recovery of heat from the molten slag has been increasing.

To date, various techniques for recovering slag heat have been proposed and published in many patent specifications and scientific literature.

Among them, for example, one method comprises casting the molten slag into a caterpillar type continuous slag casting machine or a slag truck in a closed chamber and bringing the air in and out of the closed chamber to obtain a hot blast. Another method comprises granulating the molten slag in a closed chamber by means of water vapor, air jet and a rotary drum, and introducing air into the chamber to obtain a hot air blast, and still another method comprises casting the molten slag into slag lumps, charging the slag lumps in a shaft tower, and introducing air into the tower to obtain a hot air blast.

All of the above conventional methods have considerable limitations in their commercial practice as they have defects in that the equipment requires a large scale structure and is not satisfactory in heat resistance, the heat recovery rate is low (about 35 to 40%), and the temperature of the recovered hot air is low.

SUMMARY OF THE INVENTION

Therefore, one of the objects of the present invention is to provide a method for recovering heat from a molten slag, which is free from the above defects of the conventional methods, and applicable with great advantage not only to the field of ferro-nickel production but also to other fields such as steel making, where an enormous amount of slag is produced, production of other ferro-alloys and non-ferrous metals.

The features of the present invention are that molten slag discharged from a metallurgical furnace and flowing down from a slag trough is atomized by air jet into a primary heat-exchanger of rotary cylindrical type, and hot slag granules thus obtained and air are caused to pass in a co-current therethrough so as to exchange the heat of the slag to the air flow to obtain a primary hot blast, then the hot slag granules discharge from the primary heat-exchanger are supplied to a secondary heat-exchanger connected to the primary heat-exchanger where the hot slag granules are brought into contact with a counter flow of cold air supplied from outside the system, or with a counter flow of a mixture of the above cold air and a part of the primary hot blast exhausted from the primary heat-exchanger to effect heat-exchange and to recover a secondary hot blast.

In the present invention, in order to achieve effective heat exchange with the molten slag, the slag becomes solidified. However, it is still at high temperatures and in order to increase the surface area of the solidifying slag as much as possible, it is necessary to divide the slag as finely as possible. For this purpose, the molten slag stream discharged continuously from a metallurgical furnace is atomized finely by blowing a compressed air jet thereto from an air nozzle provided at the lower side at the front end of a slag trough, and the 1100° divided slag granules thus obtained are introduced by the air atomization into a primary heat-exchanger of rotary cylindrical type where a preliminary heat exchange is performed with the air jet from the nozzle and then the hot slag granules discharged from the primary heat exchanger is introduced into a counter-current type secondary heat-exchanger separate from the primary heat-exchanger to recover continuously the hot blast from the hot slag granules. In this case, it is desirable to maintain the hot slag granules after the atomizing at a temperature below its melting point, for example, within a range of from 1100 to 1300° C. in case of the molten slag produced during ferro-nickel refining, so as to prevent the granules from adhering to each other or adhering to the inside wall of the equipments.

It may be considered to be feasible to perform the atomizing of the molten slag and the heat-exchange simultaneously only by the primary heat-exchanger. However, this procedure would have a defect in that it is necessary to discharge the slag while it is still at high temperatures after the heat recovery in order to increase the temperature of the recovered hot air blast because the slag granules and the air are in a co-current flow in the primary heat-exchanger, as clearly understood from common knowledge of the chemical engineering, and thus the heat recovery efficiency is lowered.

On the other hand, in order to increase the heat recovery efficiency by lowering the temperature of the discharged slag, it is necessary to lower the temperature of the recovered hot air blast, so that the application of the hot blast is considerably limited.

Therefore, the provision of the two separate heat-exchangers as in the present invention is most advantageous because the temperature of the hot blast can be maintained at a higher level and the heat efficiency can be increased considerably.

The present invention is considered to be most advantageous when it is considered that most of the modern metallurgical furnaces discharge the molten slag only intermittently, because according to the present invention, it is possible to obtain a hot blast continuously from the heat-exchanger and supply the hot blast directly to its specific destination such as a rotary dryer and a rotary kiln burner in accordance with the operational conditions.

The amount and temperature of the primary hot air blast exhaust from the primary heat-exchanger depend almost on the ratio of the air used for atomizing the molten slag to the molten slag, and the control of the temperature of the hot slag granules discharged from the primary heat-exchanger and the amount of air coming in through openings of the primary heat-exhanger, and the amount and temperature of the finally recovered secondary hot air blast and heat recovery efficiency depend on the control of the amount of the hot blast exhausted from the primary heat-exchanger, the amount of cold air coming into the secondary heat-exchanger from outside the system and the temperature of the cooled slag discharged from the secondary heat-exchanger. Therefore, the primary and secondary heat-exchangers are operated under such conditions as to obtain an optimum amount and temperature of the recovered secondary hot blast for its specific application with the highest possible heat efficiency.

The connection between the primary heat-exchanger and the secondary heat-exchanger, namely the transfer of the hot slag after atomizing therebetween is preferably performed continuously by a heat-resistant conveyor designed so as to prevent the heat loss, or performed discontinuously by storing the hot slag granules temporarily in a heat-resistant container. In the case where the molten slag is discharged intermittently from an electric furnace, it is desirable to provide on the upper portion of the secondary heat-exchanger a heat-resistant storing receptacle, for instance a slag bin, having a capacity matching to the interval of the molten slag discharge and the maximum storing amount of the hot slag granules discharged from the primary heat-exchanger, and a device for discharging a constant amount of the hot slag granules stored in the receptacle so as to supply the hot slag granules continuously to the secondary heat-exchanger.

Further, in order to facilitate the removal of the slag adhering to the inside wall of the primary heat-exhanger in a plate-like or ring-like form, it is effective, if the primary heat-exchanger is designed so as to have a top-cut conical shape with its wider end forming the discharge end or to cool the outer shell of the cylindrical heat-exchanger by water sprays or by air blowings.

In this case, cool water, hot water or water vapor may be mixed with the atomizing air jet, or may be blown into the primary heat-exchanger independently from the atomizing air jet. The procedures, however, should be avoided when the recovered hot blast is intended to be used for drying and calcining of ores or to be used as heat source for burners. If necessary, it is desirable to provide a crushing device at the discharging end of the primary heat-exchanger for finely crushing the hot slag granules obtained in the primary heat-exchanger so as to obtain an optimum slag particle size (for example not larger than 20 mm) for the subsequent transfer and treatment in the secondary heat-exchanger.

Regarding the secondary heat-exchanger, a conventional type of heat-exchanger such as a fluidized bed type, a stoker type and a pebble-heater type may be used other than the rotary cylindrical type depending on the condition of the hot slag granules after the atomizing but, it is desirable that they are of heat insulating structure and are designed so as to flow the hot slag granules in counter current against the air flow, thereby obtaining a high-temperature hot blast with a high degree of heat efficiency.

BRIEF EXPLANATION OF THE DRAWINGS

The present invention will be described in more detail with reference to the attached drawings.

In FIG. 1, the molten slag stream 2 dropping down from the trough 1 is atomized into floating hot slag granules 6 by the air jet 3 blown aslantly upward from the bottom side of the trough 1, and these granules 6 solidify at least on the outer circumferential portion during their floating in the primary heat-exchanger 4 of rotary cylindrical type, and drop on the bottom of the primary heat-exchanger 4 where they remain as hot granules 7, and move down due to the so-called kiln action gathering into the lower portion of the hood 5. The hot slag granules 7 thus obtained are supplied continuously to the secondary heat-exhanger 11, for example a rotary cylindrical type separately arranged from the primary heat-exchanger 4 through a chute, or they are once stored in a slag bin 8 and then supplied to the secondary heat-exchanger 11 continuously with a controlled flow rate.

Figure 1:
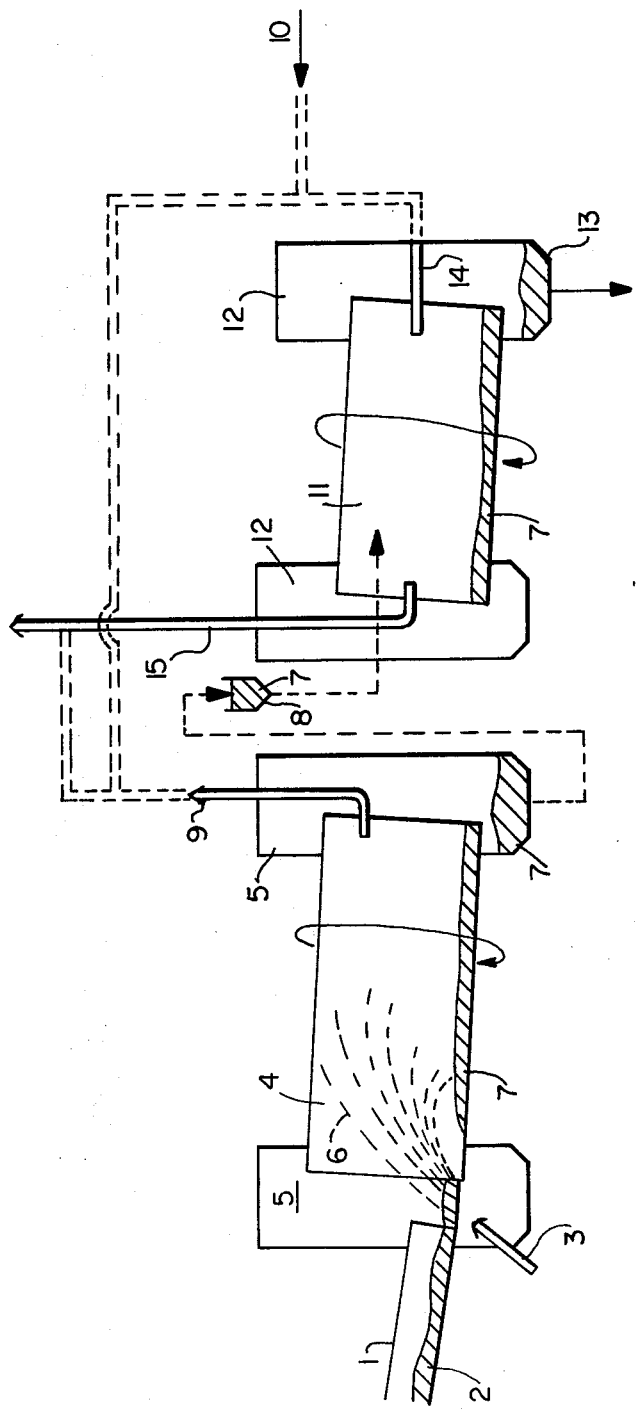
FIG. 1 shows one example of the apparatus used in the present invention.

Meanwhile, the air jet used for atomizing the molten slag in the primary heat-exchanger 4 together with air coming in the cylinder from openings, flow in a co-current to the hot slag granules, exchanging part of the slag heat to form a primary hot blast 9.

The cool air 10 introduced from outside the system into the secondary heat-exchanger 11 is mixed with at least part of the primary hot air blast 9 exhausted from the primary heat-exchanger 4 to obtain a hot air blast at a controlled temperature and in a controlled flow rate, which is blown into the secondary heat-exchanger 11 through the blowing-in opening 14 at the lower portion of the secondary heat-exchanger 11 in countercurrent to the hot slag granules 7 so as to fully cool the hot slag granules 7. After the cooling the hot blast is recovered as a secondary recovered hot blast 15 which is directed to its final destination. The cooled slag granules 13, after enough heat-exchange, are discharged from the lower portion of the hood 12 provided at the discharge end of the secondary heat-exchanger 11.

Although not shown in FIG. 1, a blower or exhaust fun of optimum design are provided in the air flow paths.

DESCRIPTION OF PREFERRED EMBODIMENTS

The present invention will be understood more clearly from the following embodiments.

EXAMPLE 1

The primary hot air blast exhausted from the primary heat-exchanger of rotary cylindrical type is mixed with a predetermined amount of cool air from outside the system to adjust the blast temperature and amount, thereby varying the temperature of the secondary hot air blast recovered from the secondary heat-exchanger of rotary cylindrical type. Variations in the heat recovery efficiency in this embodiment are shown in Table 3 and FIG. 2.

Table 1

|  | Molten Slag |
| --- | --- |
| Electric Furnace | 7500 KVA (Ferro-nickel refining furnace) |
| Slag Flow Rate | 60 t/h (average) |
| Slag Temperature | 1500°–1600° C. |
| Treating Time | 30–35 min. |

Table 2

|  | Equipment |
| --- | --- |
| Primary Heat-Exchanger | 2.5m (3m) diameter × 7m length<br>No lining<br>Inclination : 4/100<br>Rotation Rate: 15 rpm |
| Secondary Heat-Exchanger | 2.5m diameter × 10m length<br>Heat insulation of 100 mm castable lining with a lifter<br>Inclination : 4/100<br>Rotation Rate: 3 rpm |

Table 3

Relation between the temperature of the recovered secondary hot air blast and the heat recovery efficiency

|  |  | 1 | 2 | 3 | 4 |
| --- | --- | --- | --- | --- | --- |
| Primary Heat-exchange | Atomizing air jet (Nm$^3$/H) | 14,400 | 14,400 | 14,400 | 14,400 |
|  | Primary blast (Nm$^3$/H) | 16,800 | 16,800 | 16,800 | 16,800 |
|  | Primary blast temp. (° C.) | 250 | 250 | 250 | 250 |
|  | Hot slag temp. (° C.) | 1,200 | 1,200 | 1,200 | 1,200 |
| Secondary Heat-exchange | Secondary blast (Nm$^3$/H) | 58,000 | 72,200 | 94,200 | 115,200 |
|  | Secondary blast temp. (° C.) | 860 | 735 | 600 | 510 |
|  | Cooled slag temp. (° C.) | 200 | 150 | 100 | 70 |
|  | Heat Recovery (%) | 56 | 59 | 62 | 63 |

Figure 2:
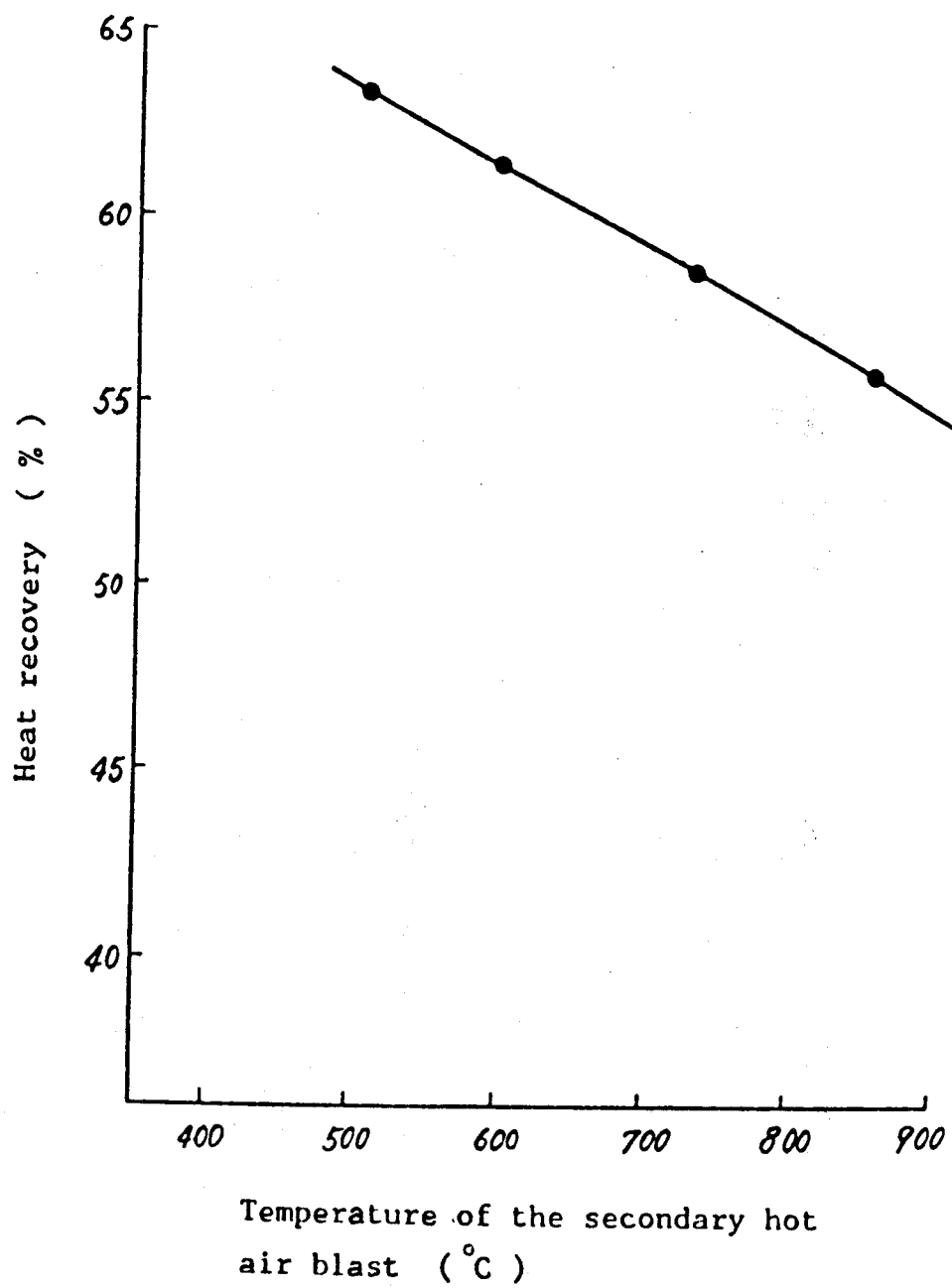
FIG. 2 is a graph showing the relation between the heat recovery efficiency and the temperature of the secondary hot air blast.

As shown in Table 3 and FIG. 2, the temperature of the secondary hot air blast has an almost linear relation with the heat recovery efficiency, and when the temperature of the secondary hot air blast is at 860° C., the heat recovery efficiency is 56%, and when the temperature is at 510° C., the efficiency is 63%.

EXAMPLE 2

Under the same condition of the slag tapping as in Example 1, the amount of the slag atomizing air, namely the ratio of the atomizing air/slag is changed. The heat-exchange efficiency (namely transfer ratio of the heat amount contained in the slag entering the heat-exchanger to the hot air blast) in each of the primary and secondary heat-exchangers, and the heat recovery efficiency, etc., are shown in Table 4, and the relation between the ratio of the atomizing air/slag and the heat recovery efficiency is shown in FIG. 3.

Figure 3:
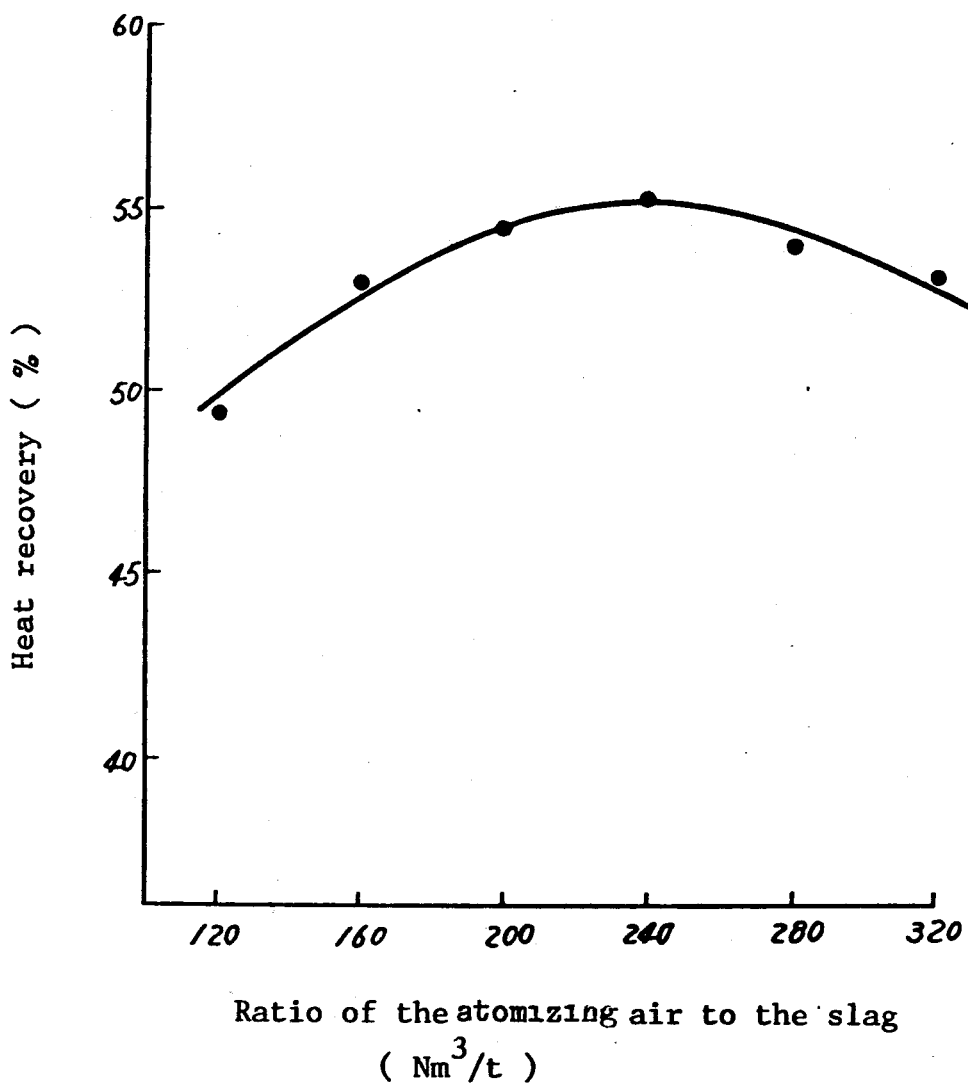
FIG. 3 is a graph showing the relation between the heat recovery efficiency and the ratio of the slag atomizing air to the slag.

As understood from the data shown in Table 4 and in FIG. 3, the most advantageous ratio of the atomizing air to the slag for obtaining a desired heat recovery efficiency is from 200 to 280 Nm$^3$/t. When the amount of the atomizing air is too small, the atomizing of the slag is incomplete so that the molten slag drops down from the top end of the slag trough and solidifies resulting in an increased proportion of lump slag in the hot slag granules, hence lowering of the heat recovery efficiency in the secondary heat-exchanger. On the other hand, when the amount of the atomizing air is excessive, the slag is atomized into excessively fine particles so that radiation and heat transfer to the surface of the shell of the primary heat-exchanger increase, resulting in lowering of the heat recovery efficiency.

EXAMPLE 3

This example shows the saving of the dryer fuel when part of the recovered hot air blast exhausted from the secondary heat-exchanger is utilized for drying nickel ores in a rotary dryer.

As shown in Table 6, when the temperature of the hot air blast is changed within a range of from 450° to 740° C., while the amount of the hot air blast introduced into the rotary dryer is maintained constant at 24,300 Nm$^3$/H, more saving of the fuel can be achieved by a higher temperature of the hot air blast, and when the amount of the hot air blast is changed within a range of from 15,000 to 27,700 Nm$^3$/H, while the temperature of the hot air blast is maintained constant at 670° C., more saving of the fuel can be achieved by a larger amount of the hot air blast.

Table 4

Results obtained by changing the amount of atomizing air jet (atomizing air/slag)

| | | Experiments No. | | | | | |
|---|---|---|---|---|---|---|---|
| | | 1 | 2 | 3 | 4 | 5 | 6 |
| Primary Heat-Exchange | Ratio of atomizing air jet/slag ($Nm^3/t$) | 120 | 160 | 200 | 240 | 280 | 320 |
| | Primary hot blast ($Nm^3/H$) | 16,000 | 16,200 | 16,500 | 16,800 | 17,000 | 19,200 |
| | Temp. of red hot slag (°C.) | 1,250 | 1,240 | 1,220 | 1,200 | 1,170 | 1,130 |
| | Primary hot blast temp. (°C.) | 170 | 200 | 230 | 250 | 270 | 250 |
| | Primary heat-exchange rate (%) | 2.9 | 3.4 | 4.0 | 4.4 | 4.8 | 5.1 |
| Secondary Heat-Exchange | Amount of cool air ($Nm^3/H$) | 58,200 | 58,200 | 56,400 | 54,900 | 52,900 | 52,000 |
| | Secondary hot blast ($Nm^3/H$) | 74,200 | 74,400 | 72,900 | 71,700 | 69,900 | 68,800 |
| | Ratio of secondary hot blast slag ($Nm^3/t$) | 1,237 | 1,240 | 1,215 | 1,195 | 1,165 | 1,147 |
| | Secondary hot blast temp. (°C.) | 600 | 650 | 680 | 700 | 700 | 700 |
| | Cooled slag temp. (°C.) | 200 | 160 | 120 | 100 | 100 | 100 |
| | Secondary heat-exchange rate (%) | 66.9 | 73.3 | 76.3 | 78.6 | 78.3 | 78.0 |
| | Heat recovery (%) | 48.5 | 53.0 | 54.5 | 55.3 | 54.0 | 53.1 |

Table 5

Rotary Dryer

Treating Capacity Wet ore 50 t/H. Dewatering 4.8t/H
3 m diameter × 30 m length
No lining, With lifter along the whole length
Inclination 3/100
Rotation Rate : 1.5 rpm
C grade Heavy Oil Burner Table 6

Saving of Fuel

| | | Hot Air Blast | | Fuel (Heavy Oil) | | |
|---|---|---|---|---|---|---|
| | | Amount ($Nm^3/H$) | Temp. (°C.) | Amount used (l/H) | Saved Amount (l/H) | Saving Rate (%) |
| No recovered hot air blast is used | | — | — | 609 | — | — |
| Recovered hot air blast is used | Constant Amount of hot air blast used | 24,300 | 450 | 263 | 346 | 56.8 |
| | | 24,300 | 535 | 183 | 426 | 70.0 |
| | | 24,300 | 650 | 84 | 525 | 86.2 |
| | | 24,300 | 740 | 0 | 609 | 100 |
| | Constant Temp. of hot air blast used | 15,000 | 670 | 274 | 335 | 55.0 |
| | | 19,500 | 670 | 174 | 435 | 71.4 |
| | | 23,600 | 670 | 83 | 526 | 86.4 |
| | | 27,700 | 670 | 0 | 609 | 100 |

What is claimed is:

1. A method for recovering heat from a molten slag which comprises atomizing the molten slag flowing down from an end of a slag trough for discharging the molten slag from a metallurgical furnace by means of air jet into a primary heat-exchanger of rotary cylindrical type passing hot slag granules thus atomized through the primary heat-exchanger in a co-current of air to effect heat-exchange with the air and to obtain a primary hot air blast, introducing the hot slag granules discharged from the primary heat-exchanger in and through a secondary heat-exchanger connected to the primary heat-exchanger in a counter current of cool air supplied from outside the heat-exchanger to effect heat exchange to obtain a secondary hot air blast.

2. A method according to claim 1, in which the cool air supplied from outside the secondary heat-exchanger is mixed with at least part of the primary hot air blast exhausted from the primary heat-exchanger.

3. A method according to claim 1, in which the air jet for atomizing the molten slag is mixed with cold water, hot water or water vapor.

4. A method according to claim 1, in which the hot slag granules discharged from the primary heat-exchanger are crushed into a particle size suitable for their transfer to and treatment in the secondary heat-exchanger.

5. A method according to claim 1, in which the hot slag granules are continuously supplied from the primary heat-exchanger to the secondary heat-exchanger.

6. A method according to claim 1, in which the hot slag granules are intermittently supplied from the primary heat-exchanger to the secondary heat-exchanger.

7. A method according to claim 1, in which the hot slag granules discharged intermittently from the primary heat-exchanger are stored once in a heat-insulated storing vessel having a capacity matching to the interval of the molten slag tapping and the maximum storing amount of the hot slag granules from the primary heat-exchanger and a constant amount of the hot slag granules thus stored is discharged to the secondary heat-exchanger to obtain continuously a secondary hot air blast.

8. An apparatus for recovering heat from a molten slag, comprising;
a molten slag trough attached to a metallurgical furnace,
an air jet blowing nozzle for blowing the air jet slantly upward toward the molten slag flowing down from the molten slag trough, said nozzle being provided below the discharge end of the molten slag trough,
a primary heat-exchanger of rotary cylindrical type in which floating hot slag granules atomized by the air jet blowing nozzle flow in a co-current of the air to effect heat-exchange and to obtain a primary hot air blast, and
a secondary heat-exchanger connected to the primary heat-exchanger in which the hot slag granules from the primary heat-exchanger flow in a counter current of cool air supplied from outside the secondary heat-exchanger optionally with at least part of the primary hot air blast to effect heat-exchange and to obtain a secondary hot air blast.

9. An apparatus according to claim 8, in which a transfer device for transferring the hot slag granules is provided between the primary heat-exchanger and the secondary heat-exchanger.

10. An apparatus according to claim 8, in which a crushing device for crushing the hot slag granules is provided between the primary heat-exchanger and the secondary heat-exchanger.

11. An apparatus according to claim granules in which a storing vessel for the hot slag grandules is provided between the primary heat-exchanger and the secondary heat-exchanger.

* * * * *

UNITED STATES PATENT AND TRADEMARK OFFICE
CERTIFICATE OF CORRECTION

PATENT NO. : 4,147,332
DATED : April 3, 1979
INVENTOR(S) : Kotaro Ishii, Masahiko Mitsutsuka and Tomoyuki Osada It is certified that error appears in the above—identified patent and that said Letters Patent are hereby corrected as shown below:

Page 1, the names of the inventors at the top of the page and on line [75] should read as follows:

-- Kotaro Ishii; Masahiko Mitsutsuka; Tomoyuki Osada --.

Signed and Sealed this

Thirty-first Day of July 1979

[SEAL]

*Attest:*

LUTRELLE F. PARKER
*Attesting Officer    Acting Commissioner of Patents and Trademarks*